(12) United States Patent
Zhang

(10) Patent No.: US 11,871,724 B2
(45) Date of Patent: Jan. 16, 2024

(54) PET HOUSE STRUCTURE

(71) Applicant: Ningbo Sentian Pet Supplies Co., Ltd, Zhejiang (CN)

(72) Inventor: Fan Zhang, Zhejiang (CN)

(73) Assignee: Ningbo Sentian Pet Supplies Co., Ltd.

( * ) Notice: Subject to any disclaimer, the term of this patent is extended or adjusted under 35 U.S.C. 154(b) by 66 days.

(21) Appl. No.: 17/506,275

(22) Filed: Oct. 20, 2021

(65) Prior Publication Data
US 2023/0047405 A1    Feb. 16, 2023

(51) Int. Cl.
*A01K 1/03* (2006.01)
*A01K 15/02* (2006.01)

(52) U.S. Cl.
CPC .......... *A01K 1/033* (2013.01); *A01K 15/024* (2013.01)

(58) Field of Classification Search
CPC ...... A01K 1/033; A01K 1/0107; A01K 1/034; A01K 1/035; A01K 1/0606; A01K 1/02; A01K 15/024; A01K 15/02
USPC .................................................. 119/482, 491
See application file for complete search history.

(56) References Cited

U.S. PATENT DOCUMENTS

| | | | |
|---|---|---|---|
| 2,787,028 A * | 4/1957 | Webb | A01K 1/033 52/302.1 |
| 3,116,847 A * | 1/1964 | Collins | B65D 9/22 119/513 |
| 4,901,672 A * | 2/1990 | Rosenberger | A01K 1/03 119/498 |
| 5,097,643 A * | 3/1992 | Wittler | F16B 5/0056 52/587.1 |
| 5,465,682 A * | 11/1995 | Chavallo, Jr. | A01K 15/025 119/498 |
| 6,318,294 B1 * | 11/2001 | Richmond | A01K 1/033 119/482 |
| 6,568,350 B1 * | 5/2003 | Savard | A01K 1/034 119/458 |
| 7,827,939 B2 * | 11/2010 | Yang | A01K 31/08 119/474 |
| 8,020,518 B1 * | 9/2011 | Reinke | A01K 15/025 119/482 |
| 8,528,257 B2 * | 9/2013 | Kobayashi | A01K 1/034 49/463 |
| D846,818 S * | 4/2019 | He | D30/160 |
| 10,492,463 B2 * | 12/2019 | Deraps | A01K 15/027 |
| D885,691 S * | 5/2020 | Song | D30/160 |

(Continued)

FOREIGN PATENT DOCUMENTS

CN    113796323 A  * 12/2021
JP    2006211919 A *  8/2006

*Primary Examiner* — Timothy D Collins
*Assistant Examiner* — Maria E Graber

(57) ABSTRACT

The present invention relates to a pet house structure that includes a bottom plate, side plates, a top cover and a plurality of profiles, wherein the side plates and the plurality of profiles are alternately connected to define and form a frame of a polygonal structure, wherein at least one of the side plate of the frame is provided with a passage, wherein the bottom plate and the top cover are connected to the plurality of profiles of the frame through fastening devices, wherein each of the profiles has a mounting cavity extending along its length direction, the mounting cavity is equipped with an inner plug, and wherein the bottom plate and the top cover are connected with the inner plug through the fastening device.

7 Claims, 9 Drawing Sheets

(56) References Cited

U.S. PATENT DOCUMENTS

| | | | | |
|---|---|---|---|---|
| 11,064,676 B2* | 7/2021 | Goldman | | A01K 1/035 |
| 2006/0243215 A1* | 11/2006 | Ho | | A01K 1/033 |
| | | | | 119/455 |
| 2010/0154719 A1* | 6/2010 | Kellogg | | A01K 15/025 |
| | | | | 119/702 |
| 2011/0146583 A1* | 6/2011 | Larson | | A01K 1/033 |
| | | | | 119/500 |
| 2011/0226190 A1* | 9/2011 | Lamontagne | | A01K 1/033 |
| | | | | 119/482 |
| 2011/0247567 A1* | 10/2011 | Chan | | A01K 1/033 |
| | | | | 119/416 |
| 2013/0074401 A1* | 3/2013 | Forno | | A01K 1/033 |
| | | | | 47/33 |
| 2016/0014995 A1* | 1/2016 | Bruno | | A01K 1/033 |
| | | | | 119/482 |
| 2016/0360729 A1* | 12/2016 | Shi | | A01K 29/005 |
| 2019/0230896 A1* | 8/2019 | Goldman | | A01K 1/035 |
| 2020/0146256 A1* | 5/2020 | Chen | | F16B 5/0012 |

* cited by examiner

PET HOUSE STRUCTURE

BACKGROUND OF THE INVENTION

Technical Field

The application relates to the technical field of pet appliances, and in particular to a pet house structure.

Description of Related Art

With the development of society and improvement of living standards, pets have become an important part of people's lives. Because small living space for a family in cities is not conducive to the life of cats and their natural habits, some cat climbing frames are developed in response to this problem and to satisfy the cat's active nature. Meanwhile, in order to save space, cat climbing frames includes more functions. For example, a cat house can be arranged on the cat climbing frame, so that the cat climbing frame can function as a cat house, as disclosed in patent 201310749312.8; however, cat houses are not easy to clean. If a pet cat stays in a dirty cat house for too long, its physical and mental health will deteriorate. In order to solve the above technical problem, Chinese Patent CN201620095658.X provides a multi-story cat house, which includes a bottom plate and a cat house arranged on the bottom plate, wherein the cat house includes a top plate, a base, side plates and fixing components; the top plate, the base and the side plates define and form a rest cavity; the top plate and the base are detachably and fixedly connected to the side plates through the fixing components. The side plate includes a detachable plate with an L-shaped cross-section. However, because the bottom plate and the top plate are respectively fixedly connected by the fixing components (screws) and the connection is easy to loosen and not firm, the overall structural strength of the cat house is low. In addition, the design of the side plate is not convenient for storage and takes up a large space. Accordingly, the transportation cost of the cat house is relatively high.

BRIEF SUMMARY OF THE INVENTION

An objective of the application is to provide a pet house structure with stronger joining. A frame assembly structure of the pet house is simpler and more convenient than the existing three-piece installation structure. Moreover, the pet house is of a detachable design, so that the pet house is easy to disassemble and clean on the one hand, and can be stored in a smaller space on the other hand, thus reducing the transportation costs greatly; in addition, because of the quick disassembly and assembly design of the pet house, users can also choose/match different styles of side plates according to their preferences during use, thus achieving an effect of DIY and being contributive to satisfying the different needs of users.

The above technical objective of the application is achieved as follow. A pet house structure, comprising a bottom plate, side plates, a top cover, and posts, wherein the side plates and the posts are alternately connected to define and form a frame of a polygonal structure; at least one side plate of the frame is provided with a passage; the bottom plate and the top cover are connected to the posts of the frame through fastening devices, so that the bottom plate, the frame and the top cover form a pet house.

Further, the post has a mounting cavity extending along its length direction, the mounting cavity is equipped with an inner plug therein, and the bottom plate and the top cover are connected with the inner plug through the fastening device so that the bottom plate, the frame and the top cover form the pet house.

Further, the post is provided with two sets of locking grooves, and two ends of the side plate are each provided with a locking protrusion that matches the locking groove of the adjacent post.

Further, the inner plug and the mounting cavity of the post 4 are in interference fit or the inner plug and the post are integrally formed and connected.

Further, the fastening device is configured as a screw, and an upper end surface and a lower end surface of the inner plug are each provided with a thread matching the screw.

Further, the post is made of aluminum or plastic.

Further, an outer side of the side plate of the frame is provided with a plush cloth.

Further, support legs are arranged around a bottom of the pet house.

Further, a top end of the pet house is provided with an upright post, a hemp rope is wound on an outer periphery of the upright post, and a ceiling is arranged at an upper end of the upright post.

Further, there are a plurality of pet houses, and the pet houses are staggered upward in a stacked manner; a base plate extends from a bottom pet house, and the base plate is provided with a support column supporting an upper pet house.

In summary, the application has the following advantages.

A pet house structure is designed as follows: side plates and posts define and form a frame, an inner plug is installed in the post, and the post is connected to the inner plug by a fastening device, so that a bottom plate, the frame and a top cover form a pet house. This design has a compact structure and a strong joints so that the pet house has a relatively higher overall structural strength. The frame assembly structure of the pet house is simpler and more convenient than the existing three-piece installation structure. Moreover, the pet house is of a detachable design, so that the pet house is easy to be disassembled and clean on the one hand, and can be stored in a smaller space on the other hand, thus reducing the transportation costs significantly; in addition, because of the quick disassembly and assembly design of the pet house, users can also choose or match different styles of side plates according to their preferences, thus achieving an effect of DIY and being contributive to satisfying the different needs of users.

In the figures: 1. bottom plate; 2. side plate; 21. passage; 22. locking protrusion; 23. plush cloth; 3. top cover; 4. post; 41. mounting cavity; 42. locking groove; 43. threaded hole; 5. frame; 6, inner plug; 7. fastening device; 8, pet house; 81, support leg; 82, upright post; 83, ceiling; 84, base plate; 85, top plate; 86, connecting post; 87, springboard.

DETAILED DESCRIPTION OF THE INVENTION

The application will be further described below with reference to the accompanying drawings.

Figure 1:
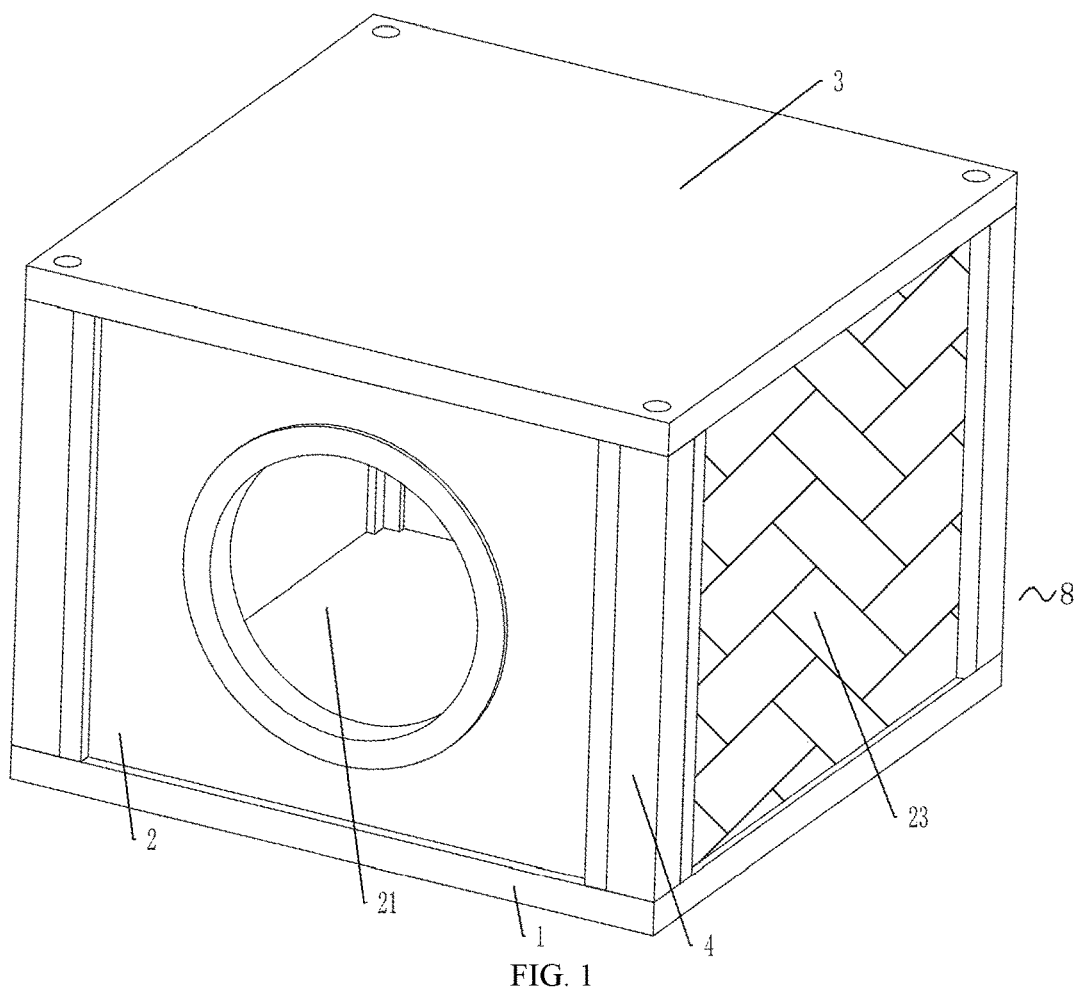
FIG. 1 is a schematic structural diagram of a first embodiment in the application.
Figure 2:
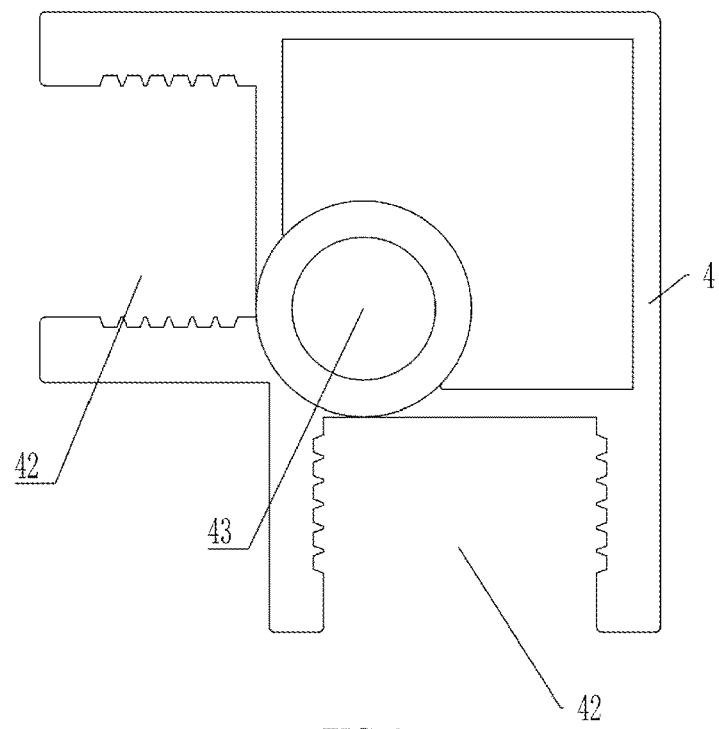
FIG. 2 is a cross-sectional view of a post according to the first embodiment of the application.

As shown in FIGS. 1 to 2, in a first embodiment, a pet house structure includes a bottom plate 1, side plates 2, a top cover 3 and posts 4; the side plates 2 and the posts 4 are alternately connected to define and form a frame 5 of a polygonal structure. Specifically, the post 4 is provided with two sets of locking grooves 42; two ends of the side plate 2 are each provided with a locking protrusion 22 that matches the locking groove 42 of the adjacent post 4; at least one side plate 2 of the frame 5 is provided with a passage 21; the bottom plate 1 and the top cover 3 are connected to the posts 4 of the frame 5 through fastening devices 7, so that the bottom plate 1, the frame 5 and the top cover 3 form a pet house 8. Specifically, an upper end surface and a lower end surface of the post 4 are each provided with a threaded hole 43, and the bottom plate 1 and the top cover 3 are fixedly connected to the posts 4 by screws.

Figure 3:
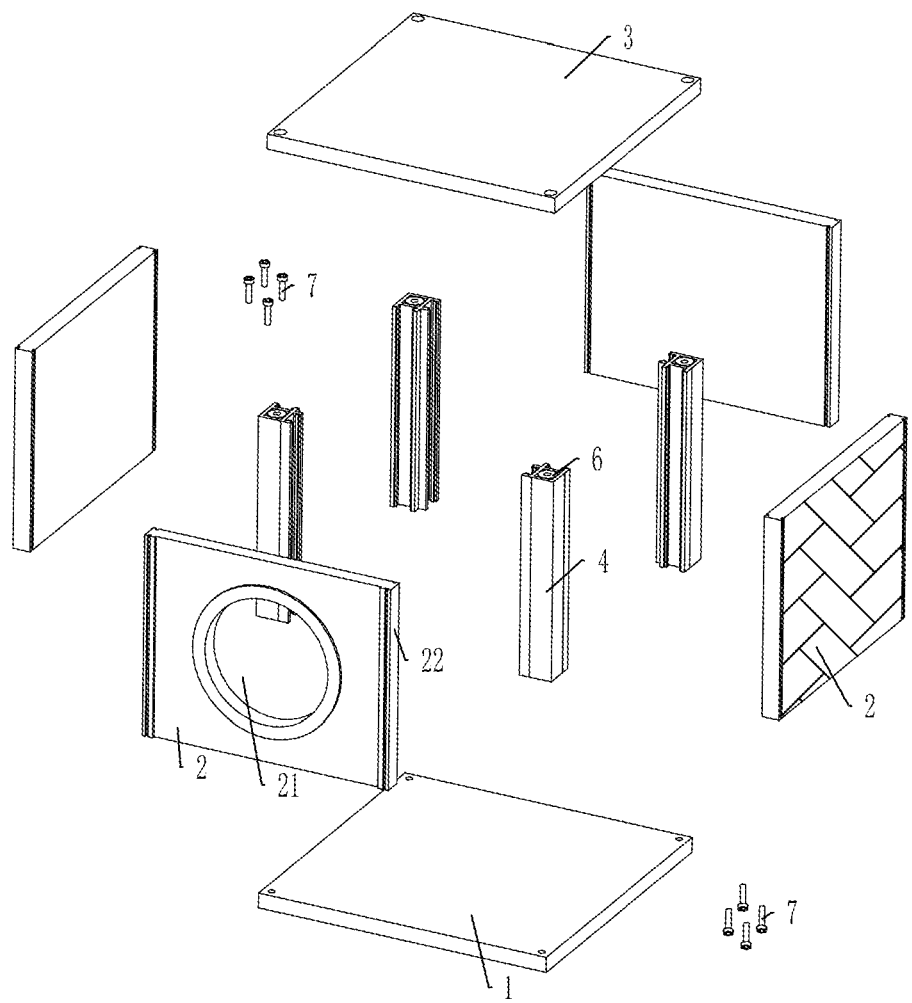
FIG. 3 is an exploded view of a second embodiment in the application.
Figure 4:
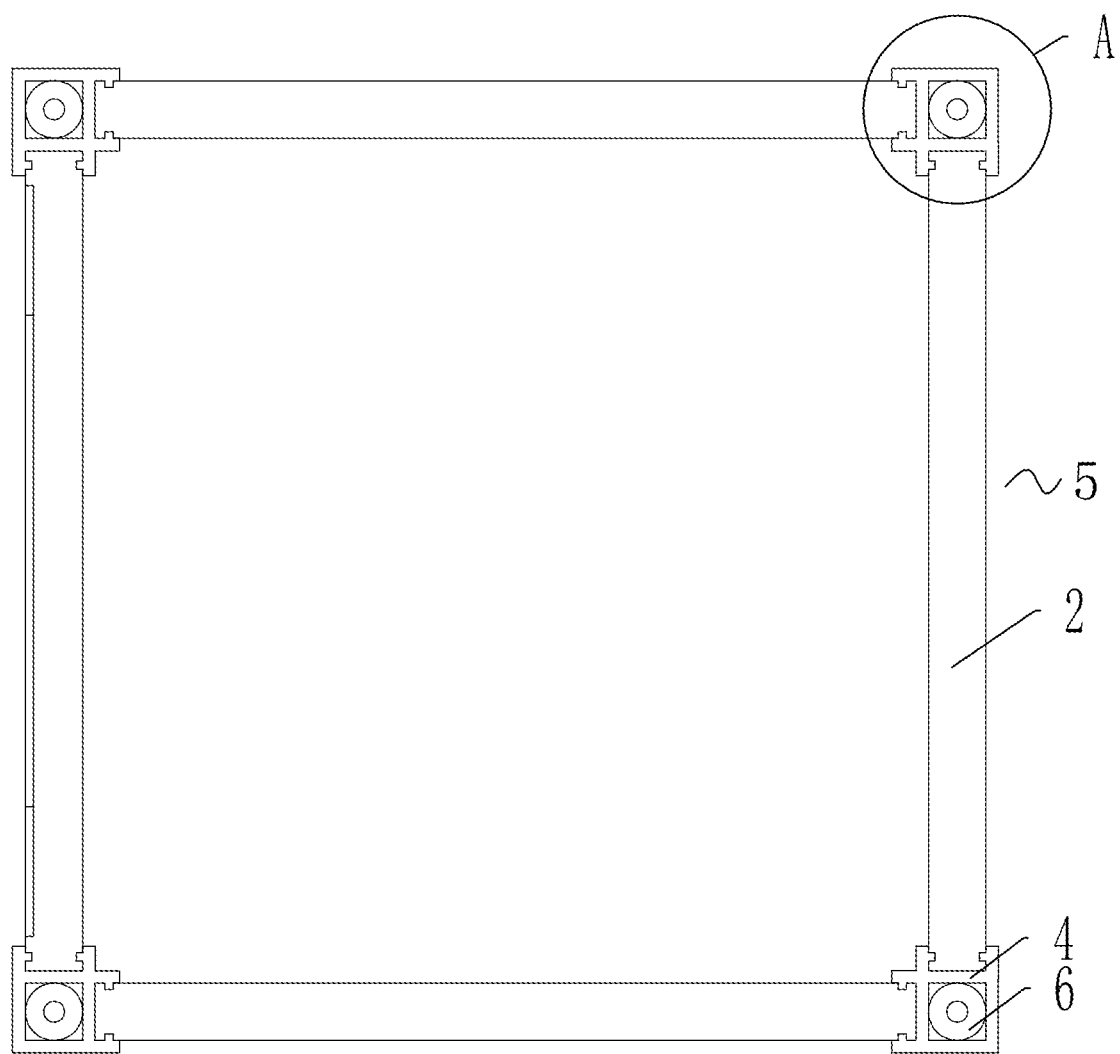
FIG. 4 is a schematic structural diagram of a frame according to the second embodiment in the application.
Figure 5:
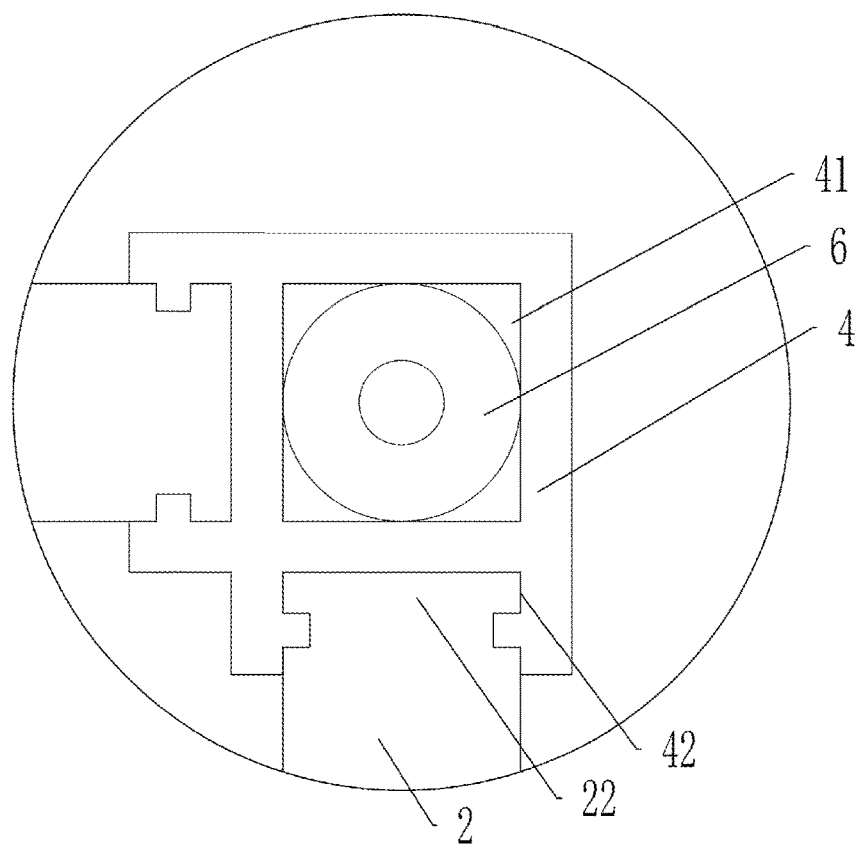
FIG. 5 is an enlarged view of part A of the application.

As shown in FIGS. 3 to 5, in a second embodiment, the post 4 has a mounting cavity 41 extending along its length direction, and the mounting cavity 41 is equipped with an inner plug 6 therein. In the application, the inner plug 6 and the mounting cavity 41 of the post 4 are in interference fit, the bottom plate 1 and the top cover 3 are connected with the inner plug 6 through the fastening device 7 so that the bottom plate 1, the frame 5 and the top cover 3 form a pet house 8. Certainly, in other embodiments, the inner plug 6 and the post 4 may also be integrally formed and connected. The cross-sectional shape of the mounting cavity 41 is square.

The fastening device 7 is configured as a screw, and an upper end surface and a lower end surface of the inner plug 6 are each provided with a thread matching the screw.

In order for the post 4 to be mass-produced quickly, the post 4 is made of aluminum or plastic.

An outer side of the side plate 2 of the frame 5 is provided with a plush cloth 23 used for pet entertainment.

Figure 6:
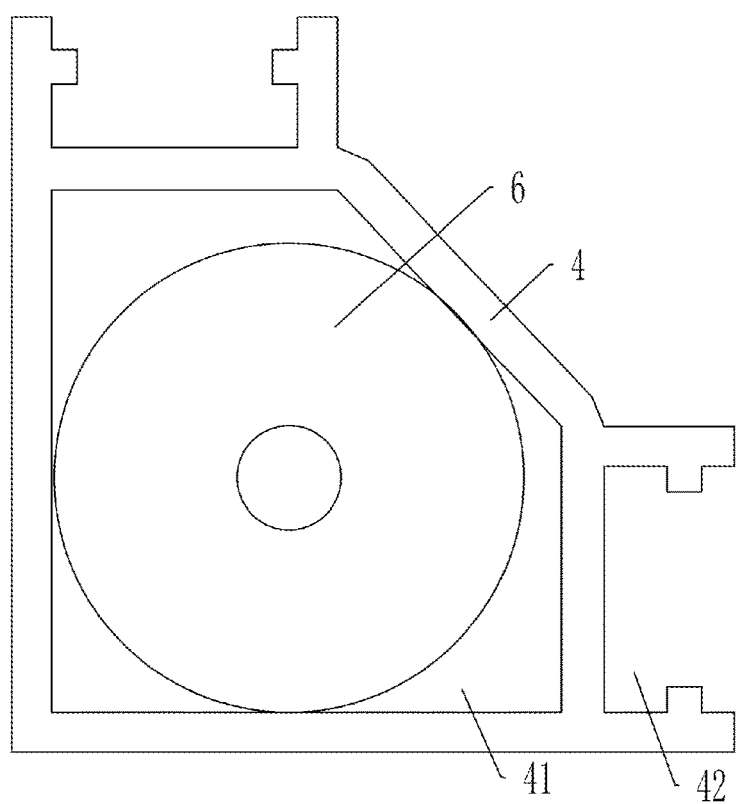
FIG. 6 is a cross-sectional view of a post according to a third embodiment of the application.

As shown in FIG. 6, in a third embodiment, except for the shape of the mounting cavity 41, a pet house structure is almost identical to the pet house structure of the second embodiment. The cross-sectional shape of the mounting cavity 41 of the third embodiment is a polygon with five sides.

Figure 7:
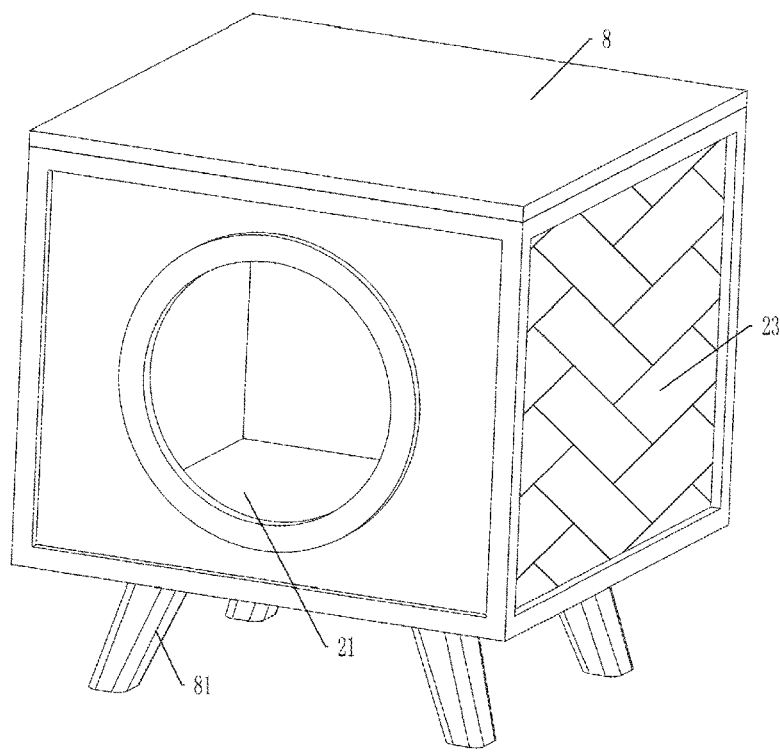
FIG. 7 is a schematic structural diagram of a fourth embodiment in the application.

As shown in FIG. 7, in a fourth embodiment, support legs 81 are arranged around a bottom of the pet house 8, and a height of the pet house 8 can be increased by arranging the support leg 81, so that the pet house 8 can be used as a stool.

Figure 8:
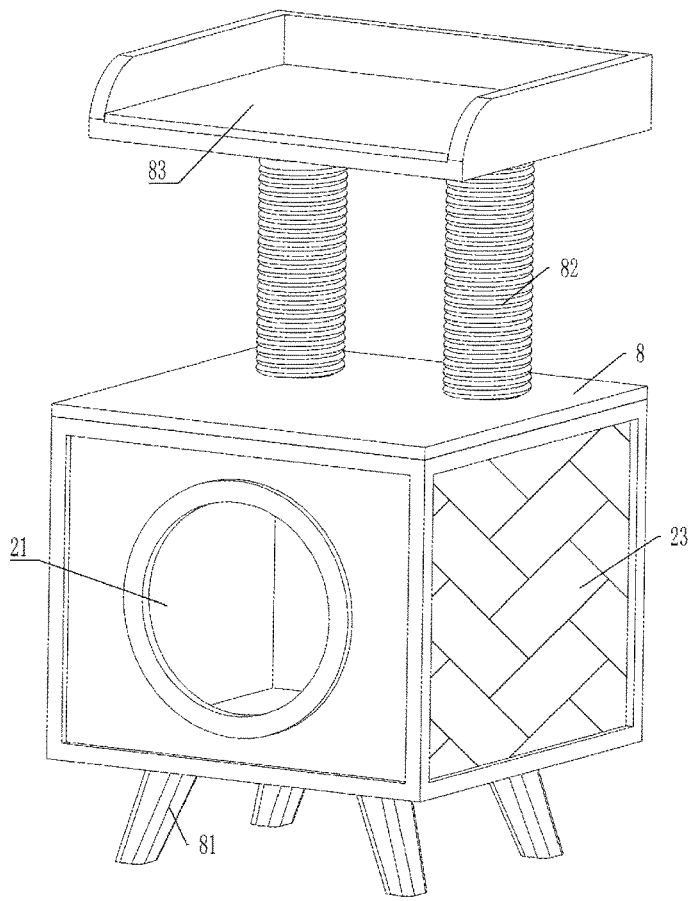
FIG. 8 is a schematic structural diagram of a fifth embodiment in the application.

As shown in FIG. 8, in a fifth embodiment, a top end of the pet house 8 is provided with an upright post 82, a hemp rope is wound on an outer periphery of the upright post 82, and a ceiling 83 is arranged at an upper end of the upright post 82.

Figure 9:
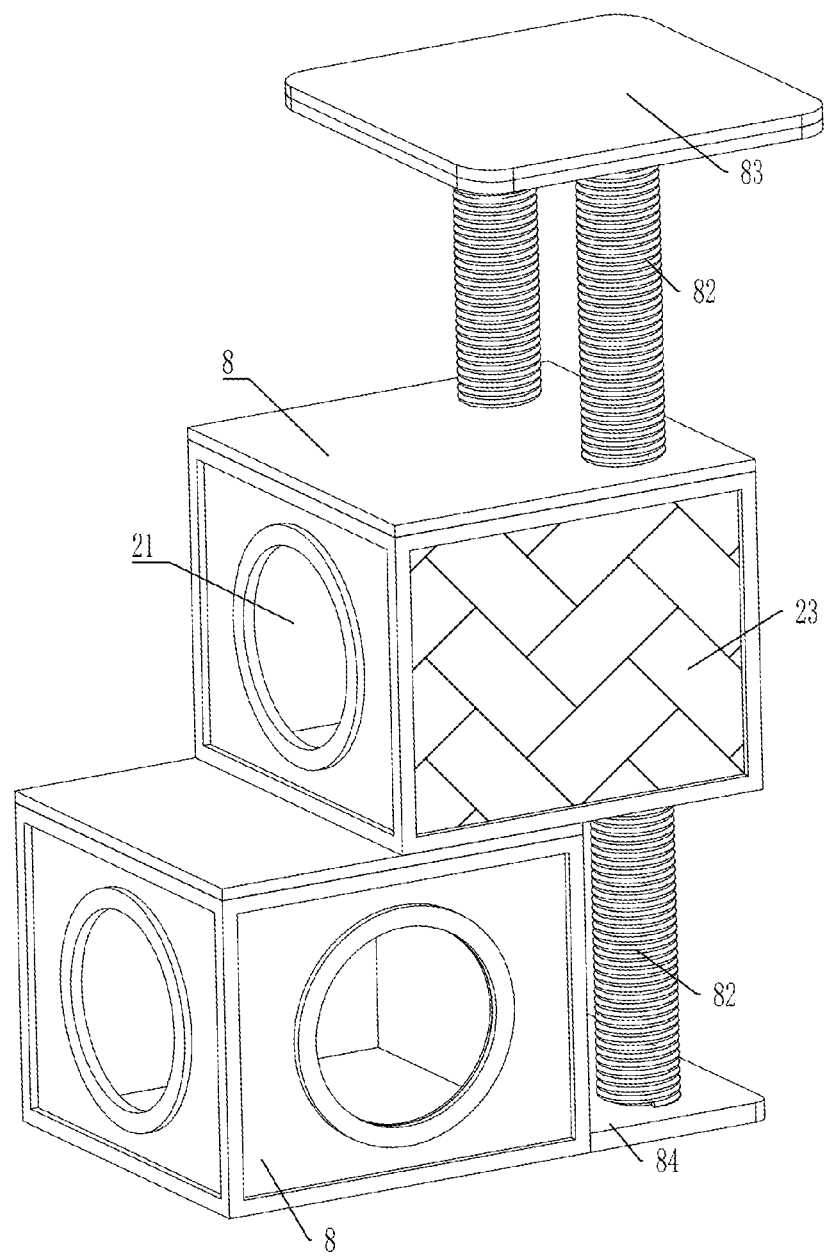
FIG. 9 is a schematic structural diagram of a sixth embodiment in the application.

As shown in FIG. 9, in a sixth embodiment, there are two pet houses 8 which are staggered up and down. A base plate 84 extends from the lower pet house 8; the base plate 84 is provided with a support column for supporting the upper pet house 8, and the ceiling 83 is fixedly connected to the upper pet house 8 through a support column, and a hemp rope is wound on an outer periphery of the support column.

Figure 10:
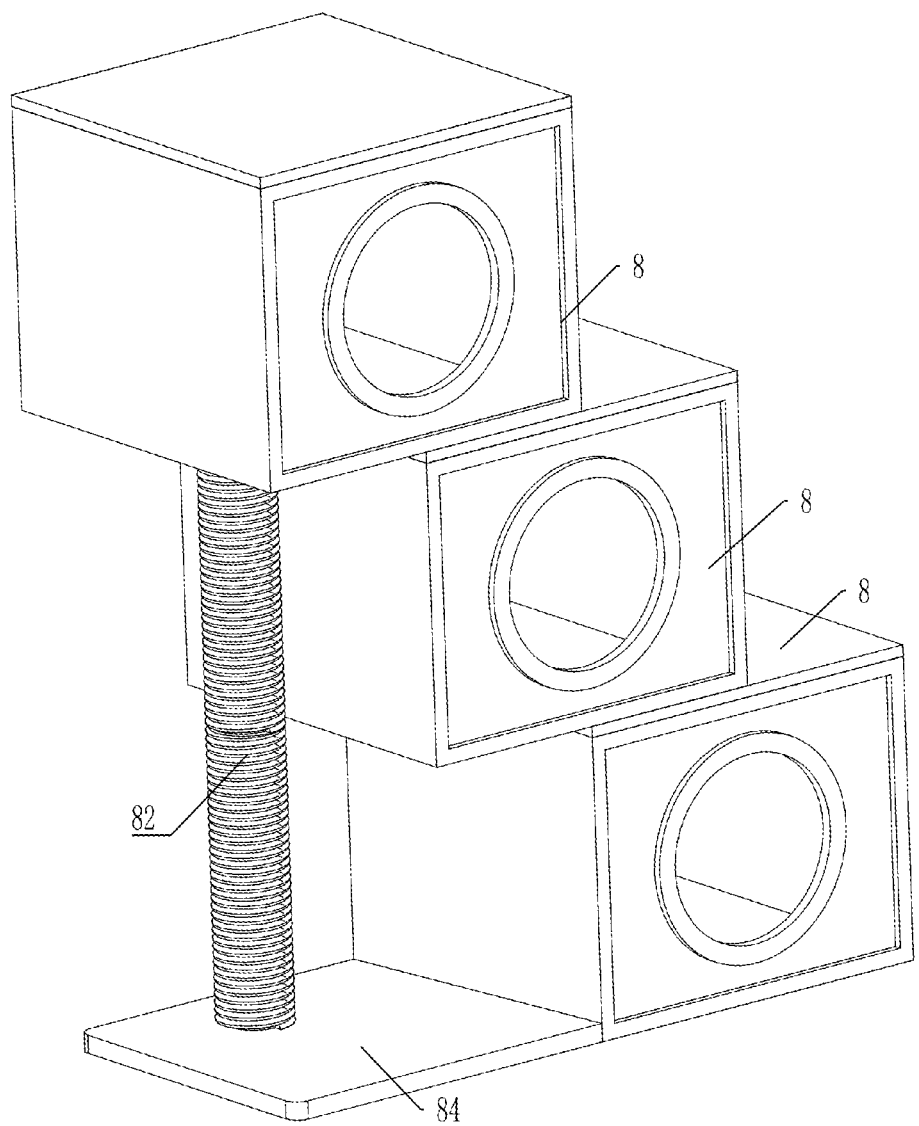
FIG. 10 is a schematic structural diagram of a seventh embodiment in the application.

As shown in FIG. 10, in a seventh embodiment, there are a plurality of pet houses 8, and the pet houses 8 are staggered upward in a stacked manner; a base plate 84 extends from a bottom pet house 8, and the base plate 84 is provided with a support column supporting an upper pet house 8.

Figure 11:
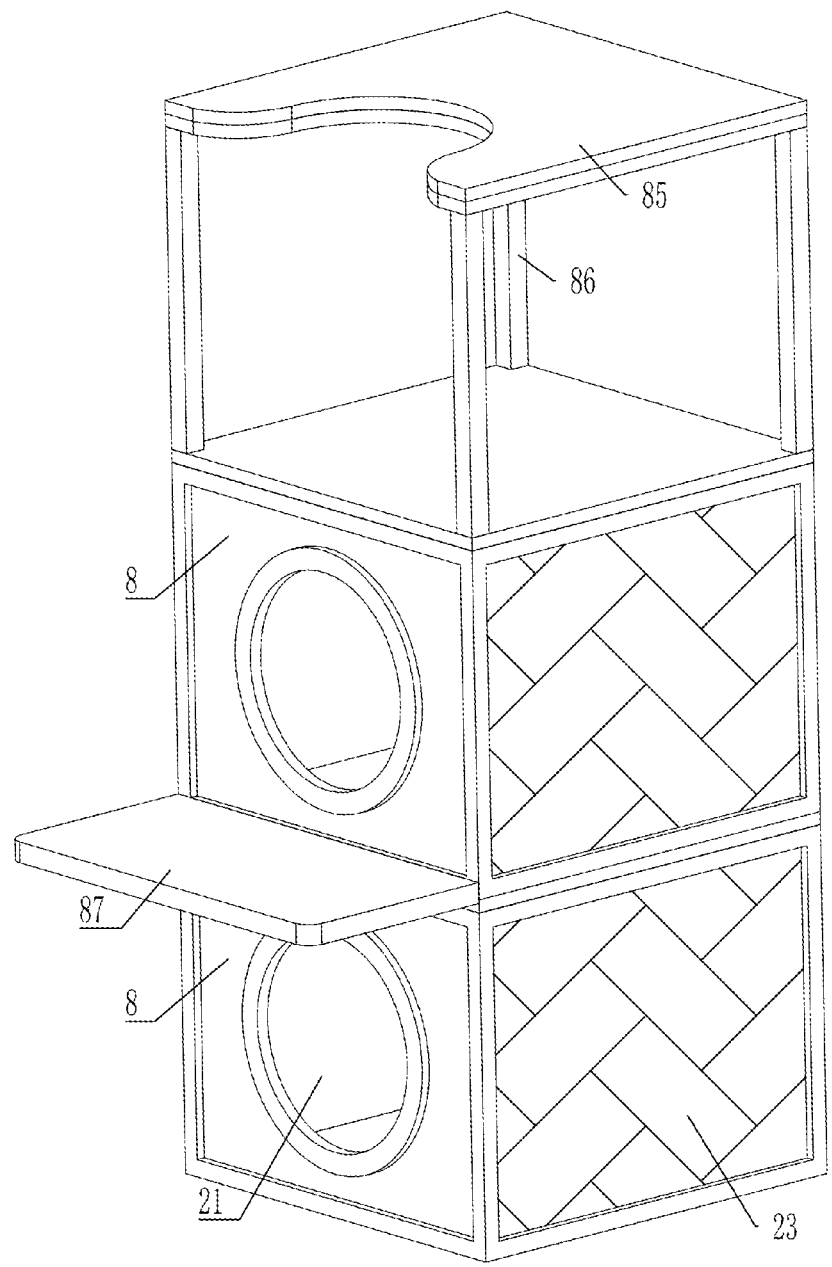
FIG. 11 is a schematic structural diagram of a eighth embodiment in the application.

As shown in FIG. 11, in a eighth embodiment, there are a plurality of pet houses 8 which are aligned up and down; a top plate 85 is arranged at an upper end of a top pet house 8, the top plate 85 is fixedly installed on the pet house 8 through a connecting column 86, and a springboard 87 is arranged between adjacent pet houses 8.

Figure 12:
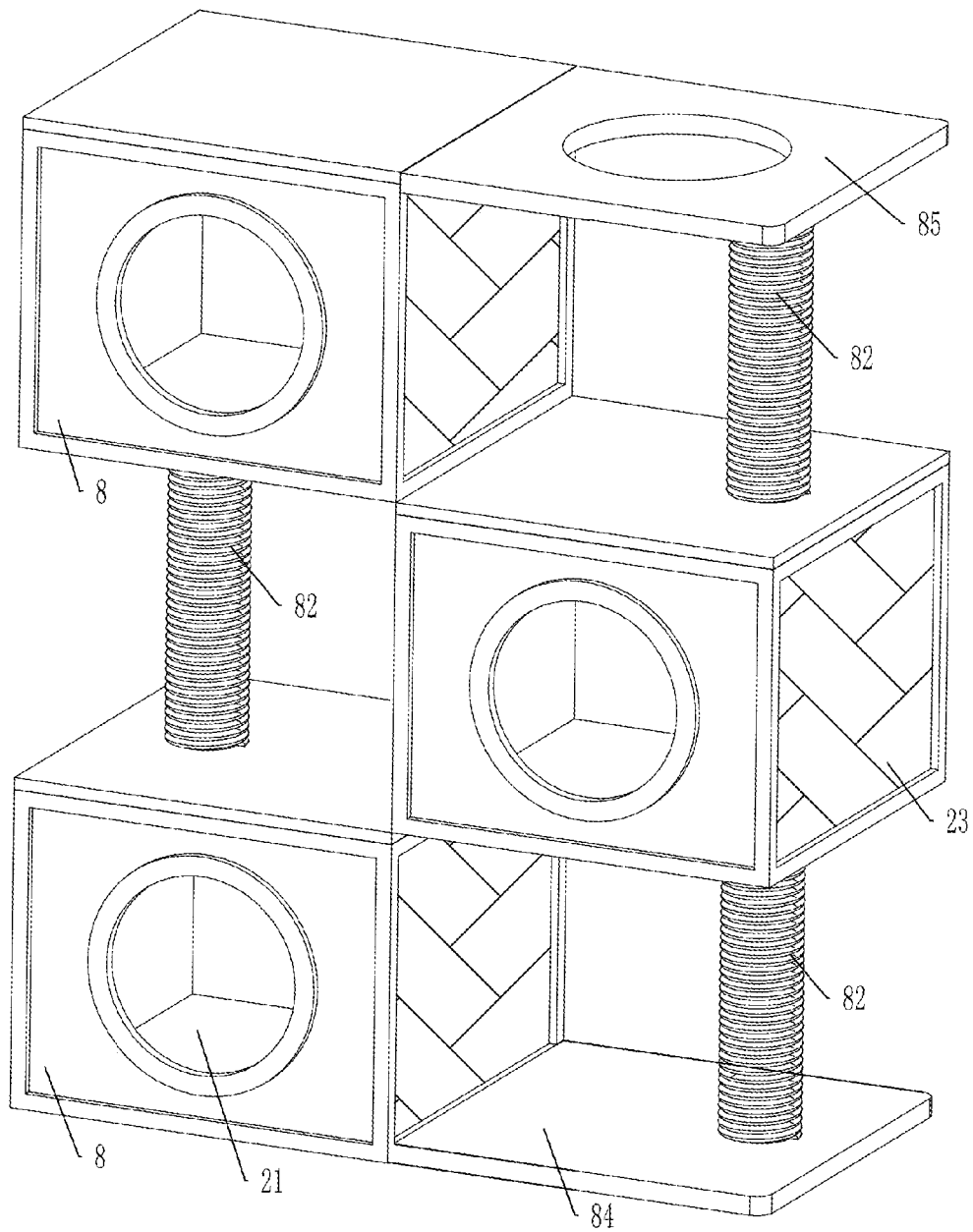
FIG. 12 is a schematic structural diagram of an ninth embodiment in the application.

As shown in FIG. 12, in an ninth embodiment, there are three pet houses 8. A top pet house 8 is located right above a bottom pet house 8 and is fixedly connected to the bottom pet house 8 by a support column. A middle pet house 8 is staggered from the top pet house 8 and the bottom pet house 8. The bottom pet house 8 is provided with a base plate 84 on a side facing the middle pet house 8. The base plate 84 is provided with a support column for supporting the pet house 8. The middle pet house 8 is provided with a support column, the support column is connected with a top plate 85, and a through hole is formed in the middle of the top plate 85.

In summary, the application has the following beneficial effects.

A pet house structure is designed as follows: side plates 2 and posts 4 define and form a frame 5, an inner plug 6 is installed in the post 4, and the post 4 is connected to the inner plug 6 by a fastening device 7, so that a bottom plate 1, the frame 5 and a top cover 3 form a pet house 8. This design has a compact structure and a firm connection so that the pet house 8 has a relatively high overall structural strength. Moreover, the pet house 8 is of a detachable design, so that the pet house is easy to disassemble and clean on the one hand, and can be stored in a smaller space on the other hand, thus reducing the transportation costs greatly; in addition, because of the quick disassembly and assembly design of the pet house, users can also choose/match different styles of side plates according to their preferences during use, thus achieving an effect of DIY and being contributive to satisfying the different needs of users.

The above only describes the preferred embodiments of the application, so any equivalent changes or modifications made in accordance with the structure, features and principles described in the scope of the present patent application for the utility model are all included in the scope of the patent application for the utility model.

The invention claimed is:

1. A pet house structure comprising: a bottom plate (1), side plates (2), a top cover (3) and a plurality of posts (4), wherein the side plates (2) and the plurality of posts (4) are alternately connected to define and form a frame (5) of a polygonal structure, wherein at least one of the side plates (2) of the frame (5) is provided with a passage (21), wherein the bottom plate (1) and the top cover (3) are connected to the plurality of posts (4) of the frame (5) through fastening devices (7), wherein each of the posts (4) further comprises a mounting cavity (41) extending the length of the posts, wherein an inner plug (6) is disposed inside the mounting cavity, wherein the length of the posts and the length of the inner plugs are identical, wherein the inner plug (6) and the mounting cavity (41) of each post (4) are in interference fit, wherein the bottom plate (1) and the top cover (3) are connected with the inner plugs (6) through the fastening devices (7);

wherein two sets of locking grooves (42) are integrally formed along the entire length of each post, wherein the two sets of locking grooves form a 90 degree angle with each other, wherein two ends of each side plate (2) are each provided with a locking protrusion (22) that matches the locking groove (42); wherein all of the locking protrusions are identical, all of the locking grooves are identical; wherein the locking protrusion and the locking groove can be connected with each other by sliding the locking protrusion into the locking groove.

2. The pet house structure according to claim 1, wherein the fastening device (7) is configured as a screw, and wherein an upper end surface and a lower end surface of the inner plug (6) are each provided with a thread matching the screw.

3. The pet house structure according to claim 1, wherein a plurality of pet houses (8) are stacked upward in a staggered manner; a base plate (84) extends from a bottom pet house (8), and the base plate (84) is provided with a support column supporting an upper pet house (8).

4. The pet house structure according to of claim 1, wherein the plurality of posts (4) are made of aluminum or plastic.

5. The pet house structure according to claim 4, wherein an outer side of the side plate (2) of the frame (5) is provided with a plush cloth (23).

6. The pet house structure according to claim 4, further comprising a plurality of support legs (81) arranged around a bottom of the pet house structure.

7. The pet house structure according to claim 4, wherein a top end of the pet house (8) is provided with an upright post (82), wherein a hemp rope is wound on an outer periphery of the upright post (82), and wherein a ceiling (83) is arranged at an upper end of the upright post (82).

\* \* \* \* \*